United States Patent Office 3,268,532
Patented August 23, 1966

3,268,532
PROCESS FOR PRODUCING DYESTUFFS OF THE ANTHRAQUINONEAZINE SERIES
Werner Zerweck and Emil Schwamberger, Frankfurt am Main, Germany, assignors to Cassella Farbwerke Mainkur Aktiengesellschaft, Frankfurt am Main-Fechenheim, Germany, a company of Germany
No Drawing. Filed Nov. 27, 1963, Ser. No. 326,350
Claims priority, application Germany, Dec. 4, 1962, C 28,574; Apr. 10, 1963, C 29,618
17 Claims. (Cl. 260—263)

This invention relates to a novel method of producing intermediates and dyestuffs of the dianthraquinone series. More particularly it relates to improved methods for producing dianthraquinoneazine and -N,N'-dihydroazine and their substituents and derivatives with higher cyclic systems by treating the corresponding primary amines with with alkaline condensation agents in the presence of low molecular weight organic sulfoxides or sulphones.

It is known to produce dianthraquinone-N,N'-dihydroazine by the caustic potash melting of 2-aminoanthraquinone represented by the following reaction:

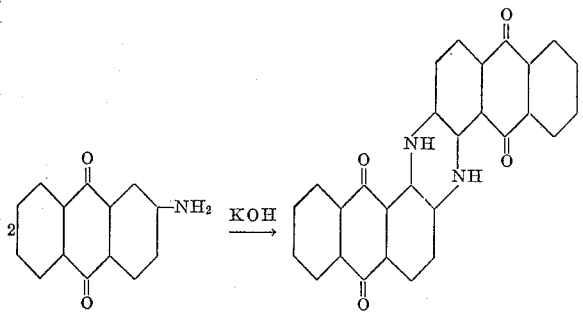

Extensive side reactions occur during this reaction and result in poor yields.

Better yields are obtained according to the U.S.A. Patent 2,693,469 in melting of 1-aminoanthraquinone with potassium phenolate. Both processes are carried out, however, at temperatures up to above 200° C. Furthermore, the production of derivatives of the dianthraquinone-N,N'-dihydroazine is practically impossible according to this process, since most of the substituents are adversely affected by the harsh reaction conditions. Furthermore there are great difficulties in producing the higher cyclic homologs of the dianthraquinone-N,N'-dihydroazine according to the known processes, since the corresponding amines do not react in the expected manner under the stated reaction conditions.

It is further known to produce dianthraquinone-N,N'-dihydroazine and its substituent products and cyclic homologs by condensing the corresponding amino compounds, which have a halogen atom in the ortho position to the amino group, by separation of two molecules of hydrogen halide to azine and hydroazine, working in high-boiling solving agents with acid-binding additives and copper catalysts.

This process requires, however, the production of o-halogenamino compounds needed as the starting materials and therefore represents added expense, time and labor as compared to the use of simple amines.

It is the object of this invention to provide an improved method of producing dianthraquinoneazine and -N,N'-dihydroazine and their substituents and derivatives free from the drawbacks of known methods. It is another object to provide a means for forming these derivatives wherein the reaction conditions are mild enough to allow the substituents to survive the reaction. It is a further object to form the higher cyclic derivatives of dianthraquinoneazine and -N,N'-dihydroazine without the expense of forming halogen substituted starting materials. It is a further object to produce these derivatives in good yields and in a substantially pure form.

It has been found that dyestuffs of the dianthraquinoneazine and -N,N'-dihydroazine series as well as their substitutents and derivatives with higher condensed cyclic systems can be obtained by reacting the corresponding primary amines with conventional alkaline condensation agents in the presence of low-molecular weight organic sulfoxides or sulphones at an elevated temperature.

As low molecular weight organic sulfoxides of 2–6 carbon atoms there may be used lower aliphatic sulfoxides, e.g. dimethylsulfoxide, diethylsulfoxide, dipropylsulfoxide; cycloaliphatic sulfoxides, e.g. tetramethylenesulfoxide. Particularly preferred are the lower alkyl sulfoxides such as dimethylsulfoxide and cycloalkyl sulfoxides such as tetramethylene sulfoxide.

As low molecular weight sulfones of 2–6 carbon atoms there may be mentioned lower aliphatic sulfones, e.g. dimethylsulfone, diethylsulfone, cycloaliphatic sulfones, e.g. tetramethylene sulfone. Particularly preferred sulfones are the lower aliphatic and cycloaliphatic sulfones such as dimethylsulfone and tetramethylenesulfone.

The organic sulfoxides and sulfones may be used by themselves or in admixture with organic solvents.

As alkaline condensation agents there may be used those alkaline condensation agents known in the art, e.g. alkali metal hydroxides in powder form as well as in aqueous solution.

In some cases the reaction can be advantageously affected by addition of organic nitrogen bases, known as a condensing agent, such as pyridine or piperidine, or of oxidation agents, such as air, per salts or nitrates. In some cases the reaction can be advantageously affected by addition of commercial wetting agents being resistant to alkalies.

The process of the invention is applicable to a wide range of starting materials. Thus the primary amine of anthraquinone or said primary amine of anthraquinone substituted with one or more additional substituents may be used. Illustrative substituents are such groups as halogen, lower alkoxy, benzyl, lower alkyl, hydroxy, amino etc. Additionally the primary amines of cyclic derivatives of anthraquinone or such derivatives substituted with the above mentioned groups may be used as starting materials. Examples of such cyclic derivatives are anthraquinonebenzacridone, dibenzanthrone, anthanthrones, dibenzopyrenequinones, pyranthrones, etc.

Further examples of anthraquinone, substituted anthraquinone, cyclic derivatives of anthraquinone and substituted cyclic derivatives of anthraquinone suitable for use in the inventive process are found in chapter 7 of The Chemistry of Synthetic Dyes and Pigments, H. A. Lubs, Reinhold Publishing Corp., New York, 1955.

Since the optimal temperatures in the inventive process in most cases are between 80 and 140° C., the danger that the substituents, such as halogen atoms, amino groups, methoxy groups, etc., would be changed by side reactions is slight compared with the above-mentioned known processes. Surprisingly, at these comparatively low temperatures even cyclic homologs of aminoanthraquinones and amines of higher condensing cyclic systems, e.g. aminoviolanthrone, can be condensed to azine and hydroazine derivatives.

For examples, in the production of vat dyestuffs according to the present process, the reaction products separate in many cases from the organic sulfoxide and sulfone as dark colored crystalline substances. They contain the vat dye-stuffs in an oxidation step, which has not yet been more closely determined, and are insoluble in water. In lye and sodium dithionite, however, they immediately yield in the dyestuff vats, from which the dyestuffs are obtained by oxidation with air and peroxides, respectively in the usual manner.

In case the azine compounds obtained still contain reactive substituents, they can be used also as intermediate products for the synthesis of further dyestuffs.

The following examples are illustrative of the method according to the instant invention. It is of course understood that the examples are for illustration only and do not constitute express or implied limitations.

*Example 1*

A mixture of 90 parts dimethyl sulfoxide, 240 parts of a 50 percent aqueous potassium hydroxide solution, and 10 parts of 1-aminoanthraquinone is stirred intensively under reflux condensing for about 7 hours at 115–120° C., then thinned with alcohol, the reaction product is drawn off, and washed with alcohol and dried. The olive-black substance obtained dissolves brown in a concentrated sulfuric acid and yields an olive-green precipitation upon pouring of the sulfuric acid solution on ice. The raw product as well as the substance reprecipitated from sulfuric acid dissolves with blue color in the sodium dithionite vat. In this vat cotton is dyed in reddish blue shades.

The dyes thus obtained show the properties of the dianthraquinone-N,N'-dihydroazine.

Instead of the potassium hydroxide a 50 percent aqueous sodium hydroxide solution can also be used in the above example.

If instead of the 1-aminoanthraquinone, 2-aminoanthraquinone is used, the same dyestuff is obtained.

*Example 2*

A mixture of 55 parts dimethylsulfoxide, 75 parts of a 50 percent aqueous potassium hydroxide solution and 5 parts of 4-aminoanthraquinone-(5'-chlorine)-1,2-benzacridone is stirred for 2½ hours at 100–110° C., then thinned with alcohol, drawn off and washed with alcohol. Finally, the substance is extracted with water, again drawn off and dried. Thus, a black substance is obtained which contains chlorine and is therefore suitable for further conversions.

If in the above example chlorine-free 4-aminoanthraquinone-1,2-benzacridone is used, a black substance is obtained after only 1½ hours and at 80–85° C. which dissolves in brown-olive in concentrated sulfuric acid and from a brown vat dyes cotton in gray shades.

If in the above example the 4-aminoanthraquinone-(5'-chlorine)-1,2-benzacridone is replaced by 1-amino-6-chlorine and 1-amino-7-chloranthraquinone, respectively, products are obtained which still contain chlorine and show geenish blue color shades of cotton from the sodium dithionite vat.

*Example 3*

A mixture of 55 parts of dimethyl sulfoxide, 75 parts of 50 percent aqueous potassium hydroxide solution and 5 parts of monoamino-dibenzanthrone (obtained by nitration of dibenzanthrone and reduction) is stirred for 15–18 hours at 100–105° C., thinned with alcohol and dried. A black powder is thus obtained which dye cotton from a blue sodium dithionite vat in dark gray shades. It dissolve in concentrated sulfuric acid to reddish violet.

*Example 4*

A mixture of 55 parts of dimethyl sulfoxide, 60 parts of 50 percent aqueous potassium hydroxide solution and 5 parts of 1,4-diaminoanthraquinone is stirred at 115–120° C. for about 4 hours, then cooled, thinned with alcohol, the precipitation drawn off, washed with alcohol and dried. A black powder is thus obtained which dissolves bluish olive-green in concentrated sulfuric acid and dyes cotton in bluish olive-green from a reddish blue-gray sodium dithionite vat.

If instead of the 1,4-diaminoanthraquinone, the 1-amino-4-benzoylaminoanthraquinone is used, a yellowish olive-green vat dyestuff is obtained.

If in the above example instead of the potassium hydroxide one should use a 50 percent aqueous sodium hydroxide solution and instead of 1,4-diaminoanthraquinone one should use the 1-amino-4-methoxyanthraquinone, a gray vat dyestuff is obtained.

*Example 5*

A mixture of 60 parts of dimethyl sulfoxide, 10 parts of pulverized potassium hydroxide and 5 parts of 1-aminoanthraquinone is stirred about 4 hours at 100–105° C., then thinned with alcohol, the reaction production thus obtained is drawn off, washed and dried. It is a black powder from which by reduction and oxidation with air a blue dianthraquinone-N,N'-dihydroazine can be obtained. Sodium hydroxide can also be used instead of the potassium hydroxide.

*Example 6*

10 parts of sodium perborate are introduced at 115–120° C. within two hours into a mixture of 90 parts of dimethylsulfoxide, 240 parts of 50 percent aqueous potassium hydroxide solution and 10 parts of 1-aminoanthraquinone. Then the mixture is stirred for another half hour at this temperature. After deposit and drawing off of the potassium hydroxide, the dimethylsulfoxide layer is thinned with about 400 parts of alcohol, heated to boiling, the crystallized black substance is drawn off hot and washed with alcohol and water. The paste thus obtained is suspended in water, made Congo acid with hydrochloric acid and boiled, wherein the color of the substance changes from black to blue. After drawing off, washing and drying, one obtains dianthraquinone-N,N'-dihydroazine in the form of dark blue crystals.

Instead of the sodium perborate other per salts or even nitrates, such as potassium nitrate, can also be used as the oxidation agent.

*Example 7*

In 250 parts of 50 percent aqueous potassium hydroxide solution 0.3 part of vanadium pentoxide is dissolved, 100 parts of dimethylsulfoxide are added, and 30.9 parts of 1-aminoanthraquinone are quickly introduced into the well mixed heterogeneous mixture at 120–125° C. An active air current is conducted through the reaction mass for three hours, wherein the evaporating water is reduced by a cooler. After turning off the stirrer and the air, the reaction mixture separates into two layers, the top one consisting of dimethylsulfoxide contains the reaction product in the form of microscopic crystals, while the potassium hydroxide solution forms the lower layer containing the vanadic acid. The latter is siphoned off, and the upper layer is drawn off after thinning with the 3 or 4-fold water amount. The greatest part of the dimethylsulfoxide can be regained by vacuum distillation from the filtrate obtained after distillation of water and neutralization of the alkali.

The black reaction product washed on the filter with water is suspended in about 2000 parts of water of 55–60° C. and reduced by addition of about 15 parts of sodium hydroxide and 20–25 parts of sodium dithionite, wherein the violet, difficultly soluble sodium salt of the leuco compound of the anthraquinonedihydroazine precipitates, which is separated by the filtration from the reduced side products and is oxidized in the known manner to the blue vat dyestuff.

Instead of vanadium pentoxide, compounds of iron, of cobalt and other heavy metals can also be introduced.

The potassium hydroxide, which is hardly used by the reaction, can be reused. It is also possible to carry out the process continuously in that the suspension of 1-aminoanthraquinone in dimethylsulfoxide is slowly led with air through the potassium hydroxide and the reaction product is separated on a rotating filter. An apparatus suited for the continuous process is, for example, a

Example 8

In 250 parts of 50 percent aqueous potassium hydroxide solution, 1.5 parts of the sodium salt of the sulfuric acid ester of oxystearic acid N-ethylanilide (commercial alkali resistant wetting agent) are dissolved, mixed with 100 parts of dimethyl sulfoxide, and into the well stirred heterogeneous mixture, 30.9 parts of 1-aminoanthraquinone are quickyl introduced at 120°–125° C. An active air current is conducted through the reaction mass for five hours, wherein the evaporating water is reduced by a cooler. After turning off the stirrer and the air, the reaction mixture separates into two layers, the top one consisting of dimethylsulfoxide contains the reaction product in the form of microscopic crystals. The potassium hydroxide is siphoned off, and the upper layer is drawn off after thinning with 3 or 4-fold amount of water. The greatest part of the dimethylsulfoxide can be regained by vacuum distillation from the filtrate obtained, after distillation of water and neutralization of the alkali.

The black reaction product washed on the filter with water is suspended in about 2000 parts of water at 55–60° and reduced by addition of about 15 parts of caustic soda and 20–25 parts of sodium dithionate, wherein the violet, difficultly soluble sodium sale of the leuco compound of anthraquinonedihydroazine precipitates, which is separated from the reduced side products by filtration and is oxidized in the known manner to the blue vat dyestuff.

Thus a pure anthraquinone dihydrodiazine is obtained in a yield of over 80% of the theoretical.

In the above example any commercial wetting agent being resistant to alkalies may be used in place of the beforementioned wetting agent.

Example 9

A mixture of 90 parts of 50 percent aqueous potassium hydroxide solution, 40 parts of tetramethylene sulfoxide and 10 parts of 1-aminoanthraquinone is heated during stirring and conducting of air to 120–125° C. in the reflux condenser for 6 to 7 hours. Then the reaction mixture is introduced into about 1000 parts of water, the separating black reaction product is drawn off and washed. By reduction of the paste, obtained by mixing with about 700 parts water, with 5 parts of caustic soda and 7 parts of sodium dithionite, sodium salt of the leuco compound of anthraquinone dihydroazine is obtained, which is oxidized with air to the blue dyestuff, as described in the preceding examples.

Example 10

During vigorous stirring, 8 parts of 1-aminoanthraquinone are introduced into a mixture, heated to 120–125° C., of 90 parts of a 50 percent aqueous potassium hydroxide solution and 30 parts of dimethylsulfone. Then this is mixed with 10 parts of sodium perborate at 120–125° C. during reflux cooling during two hours. After a further half hour, the starting material is cooled to 70° C., thinned with alcohol, drawn off, the residue is washed with alcohol and dried. Thus a dark dyestuff powder is obtained. Cotton is dyed in blue shades from the sodium dithionite vat. The resulting anthraquinone-dihydroazine can be purified by separation of the leuco compound sodium salt or by precipitation from sulfuric acid.

Example 11

15 parts of sodium perborate are introduced in the course of 3 hours into a mixture of 60 parts of tetramethylenesulfone, 150 parts of a 50 percent aqueous potassium hydroxide solution and 10 parts of 1-aminoanthraquinone. The starting material is treated as described in Example 10. Anthraquinone dihydroazine is obtained in a likewise manner.

The addition of sodium percarbonate can be omitted when air is conducted through the reaction mixture for 6 hours at 130–135° C.

We claim as our invention the following:

1. A process for the production of dyestuffs of the anthraquinoneazine and -N,N'-dihydroazine series which comprises contacting at elevated temperatures a primary amine of a compound selected from the group consisting of anthraquinone, substituted anthraquinone, cyclic derivatives of anthraquinone and substituted cyclic derivatives of anthraquinone with an alkaline condensation agent in the presence of a member selected from the group consisting of low molecular weight hydrocarbyl organic sulfoxides and low molecular weight hydrocarbyl organic sulfones of 2–6 carbon atoms.

2. A process according to claim 1 wherein the temperature of the contacting is between 80 and 140° C.

3. A process according to claim 1 wherein the alkaline condensation agent is an alkali metal hydroxide.

4. A process according to claim 1 wherein the low molecular weight organic sulfoxide is dimethylsulfoxide.

5. A process according to claim 1 wherein the low molecular weight organic sulfone is dimethylsulfone.

6. A process according to claim 1 wherein the low molecular weight organic sulfone is tetramethylenesulfone.

7. A process according to claim 1 wherein the low molecular weight organic sulfoxide is tetramethylenesulfoxide.

8. A process according to claim 1 wherein the contacting is carried out in the presence of an oxidation agent.

9. A process for the production of dyestuffs of the anthraquinoneazine and -N,N'-dihydroazine series which comprises contacting at a temperature of 80–140° C. the primary amine of a member selected from the group consisting of anthraquinone, substituted anthraquinone, anthraquinone 1,2-benzacridone, chlorine substituted anthraquinone 1,2-benzacridone and dibenzanthrone with an alkali metal hydroxide condensation agent in the presence of a member selected from the group consisting of dimethylsulfoxide, tetramethylenesulfoxide, dimethylsulfone and tetramethylenesulfone.

10. A process according to claim 9 in which the primary amine of anthraquinone is contacted with dimethylsulfoxide.

11. A process according to claim 9 in which the primary amine of anthraquinone 1,2-benzacridone is contacted with dimethylsulfoxide.

12. A process according to claim 9 in which the primary amine of dibenzanthrone is contacted with dimethylsulfoxide.

13. A process according to claim 9 in which the primary amine is contacted with tetramethylenesulfoxide.

14. A process according to claim 9 in which the primary amine is contacted with tetramethylenesulfone.

15. A process according to claim 9 in which the primary amine is contacted with dimethylsulfone.

16. A process according to claim 9 in which the contacting is carried out in the presence of an axidizing agent.

17. A process according to claim 9 in which the contacting is carried out in the presence of a wetting agent being resistant to alkalies.

No references cited.

HENRY R. JILES, *Acting Primary Examiner.*

JAMES W. ADAMS, JR., *Assistant Examiner.*